United States Patent
Chu et al.

(10) Patent No.: US 9,508,369 B2
(45) Date of Patent: Nov. 29, 2016

(54) DEFINING A MAXIMUM SEQUENTIAL WRITE DURATION FOR A DATA STORAGE DEVICE UTILIZING HEAT-ASSISTED RECORDING

(71) Applicant: Seagate Technology LLC, Cupertino, CA (US)

(72) Inventors: Alfredo Sam Chu, Prior Lake, MN (US); Wenzhong Zhu, Apple Valley, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/657,313

(22) Filed: Mar. 13, 2015

(65) Prior Publication Data

US 2016/0267930 A1     Sep. 15, 2016

(51) Int. Cl.
| | | |
|---|---|---|
| G11B 11/00 | (2006.01) | |
| G11B 5/48 | (2006.01) | |
| G11B 5/00 | (2006.01) | |
| G11B 5/31 | (2006.01) | |
| G11B 11/105 | (2006.01) | |
| G11B 7/126 | (2012.01) | |

(52) U.S. Cl.
CPC ............ *G11B 5/4866* (2013.01); *G11B 5/314* (2013.01); *G11B 7/126* (2013.01); *G11B 11/10595* (2013.01); *G11B 2005/001* (2013.01); *G11B 2005/0021* (2013.01)

(58) Field of Classification Search
USPC ......... 369/13.33, 13.13, 13.32, 13.17, 13.26, 369/13.24, 13.25, 116, 47.5–47.53; 360/59
See application file for complete search history.

(56) References Cited

U.S. PATENT DOCUMENTS

| | | | | |
|---|---|---|---|---|
| 6,172,944 B1* | 1/2001 | Hatam-Tabrizi | .. | G11B 11/10554 369/13.28 |
| 7,672,074 B2* | 3/2010 | Kamimura | ........... | G11B 5/6005 360/59 |
| 9,152,568 B1* | 10/2015 | Seigler | ................ | G06F 12/0866 |
| 2004/0081435 A1* | 4/2004 | Maehashi | ........ | G11B 20/10527 386/235 |
| 2007/0268613 A1* | 11/2007 | Fitzpatrick | ................ | G11B 5/02 360/75 |
| 2011/0205861 A1* | 8/2011 | Erden | ....................... | G11B 5/02 369/13.27 |
| 2013/0007380 A1 | 1/2013 | Seekins et al. | | |
| 2014/0160906 A1* | 6/2014 | Yamada | ................ | G11B 5/4853 369/13.12 |
| 2015/0221332 A1* | 8/2015 | Isokawa | ................... | G11B 5/02 369/13.26 |

* cited by examiner

*Primary Examiner* — Tan X Dinh
(74) *Attorney, Agent, or Firm* — Hollingsworth Davis, LLC

(57) ABSTRACT

A maximum write duration is determined for first and second heat-assisted write transducers of a data storage device. Exceeding the duration results in thermal degradation of the first and second write transducers. A request to write data to a heat-assisted recording medium is received. In response to a time to fulfill the request exceeding the maximum write duration, the data is divided into portions such that a respective writing of each of the portions does not exceed the maximum write duration. Writing successive ones of the portions to the heat-assisted recording medium involves alternating between the first and second write transducers.

20 Claims, 7 Drawing Sheets

DEFINING A MAXIMUM SEQUENTIAL WRITE DURATION FOR A DATA STORAGE DEVICE UTILIZING HEAT-ASSISTED RECORDING

SUMMARY

The present disclosure is directed to defining a maximum sequential write duration for a device utilizing heat-assisted recording. In one embodiment, a method and apparatus facilitate determining a maximum write duration for first and second heat-assisted write transducers of a data storage device before thermal degradation of the first and second write transducers occur. A request to write data to a heat-assisted recording medium is received, and a time to fulfill the request exceeds the maximum write duration. In response, the data is divided into portions such that a respective writing of each of the portions does not exceed the maximum write duration. Writing successive ones of the portions to the heat-assisted recording medium involves alternating between the first and second write transducers.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to reading and writing of data with a heat assisted magnetic recording (HAMR) data storage device. This technology, also referred to as energy-assisted magnetic recording (EAMR), thermally-assisted magnetic recording (TAMR), thermally-assisted recording (TAR), etc., uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to paramagnetic effects that can lead to data errors.

In the embodiments described below, a controller may limit the amount of time that a single optical path of a HAMR read/write head is energized during writing. The HAMR data storage device may include two or more write heads, and so long writes can be divided into smaller segments, and distributed over different write heads which write to different surfaces of a recoding medium. This can be achieved, e.g., by defining a maximum write segment size per surface. In other embodiments, two optical paths may be included on a single write head (e.g., tied to a common laser or separate lasers), and long writes can be divided between these optical paths while using the same read/write head.

Figure 1:
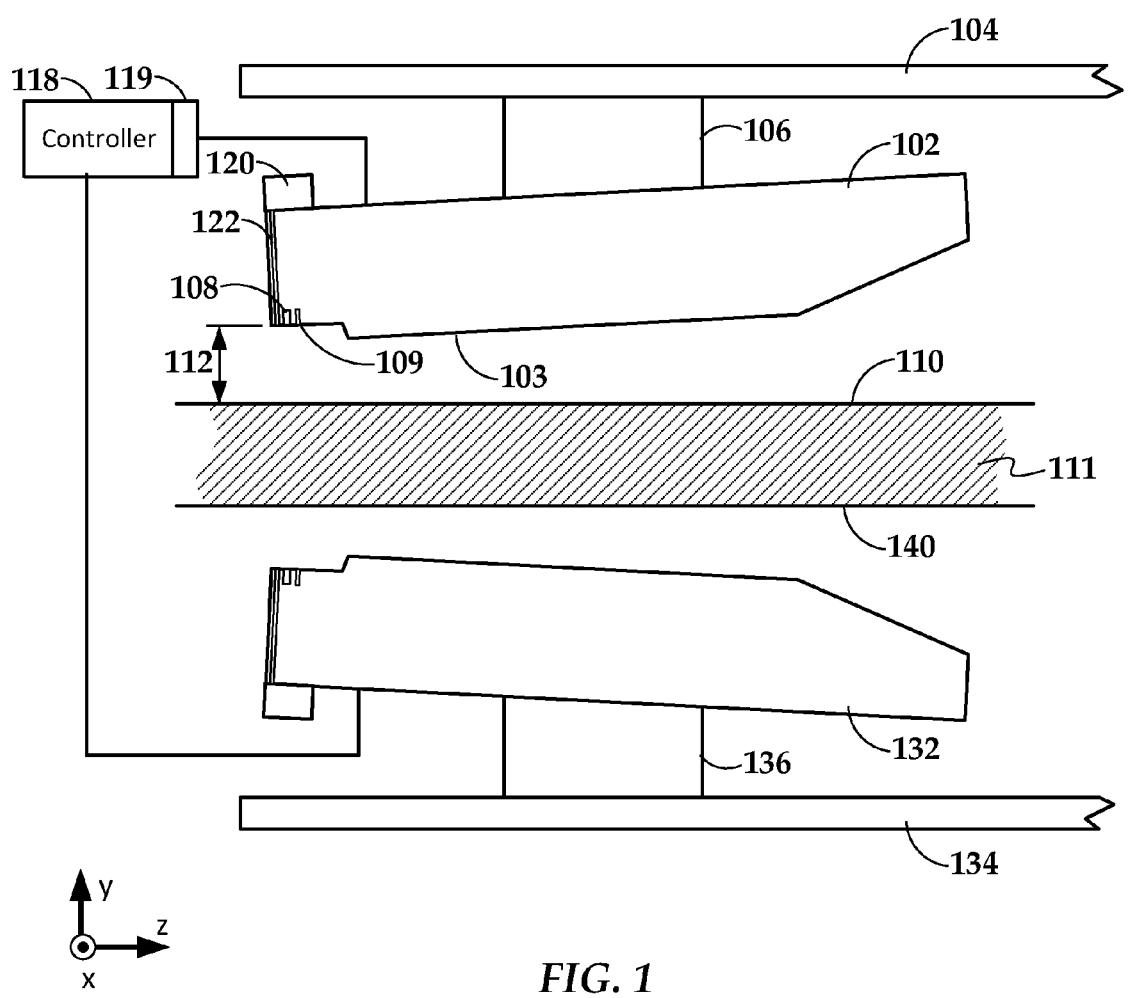
FIG. 1 is a block diagram of a hard drive slider and recording medium according to an example embodiment.

In reference now to FIG. 1, a block diagram shows components of a HAMR data storage device, e.g., disk drive, according to an example embodiment. A read/write head 102 is used to write and read data to a heat-assisted recording medium 111, e.g., a magnetic disk. The read/write head 102 may also be referred to herein as a slider, read head, recording head, etc. The read/write head 102 is coupled to an arm 104 by way of a suspension 106 that allows some relative motion between the read/write head 102 and arm 104. The read/write head 102 includes read/write transducers 108, 109 at a trailing edge that are held proximate to a surface 110 of a heat-assisted recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

The illustrated read/write head 102 is configured as a HAMR recording head, which includes additional components that generate heat near the write transducer 108. These components include the laser 120 (or other energy source) and waveguide 122. The waveguide 122 delivers light from the laser 120 to components near the read/write transducers 108. These components are described in greater detail below.

The HAMR data storage device may include a second read/write head 132 coupled to a second arm 134 by way of suspension 136. The second read/write head 132 may include the same features described above regarding read/write head 102, e.g., laser, transducers, waveguide, etc. The second read/write head 132 is held over a second surface 140 of the recording medium 111. The arms 104, 134 are moved together via an actuator, e.g., a voice coil motor, and the individual heads 102, 132 may be moved independently via microactuators (not shown) dedicated to each head. Generally, this may be extended to additional recording media, e.g., 2N heads each reading one of 2N surfaces of N disks.

A controller 118 is coupled to the read/write heads 102 via interface circuitry 119. The interface circuitry 119 may include preamplifiers, filters, digital-to-analog converters (DACs), analog-to-digital converters (ADCs), buffers, etc. The controller processes signals sent to and received from the read and write transducers 108, 109. The controller 118 may also control other aspects of the head's operation, such as dynamic head-media spacing via internal heaters (not shown), and activating laser 120.

Figure 2:
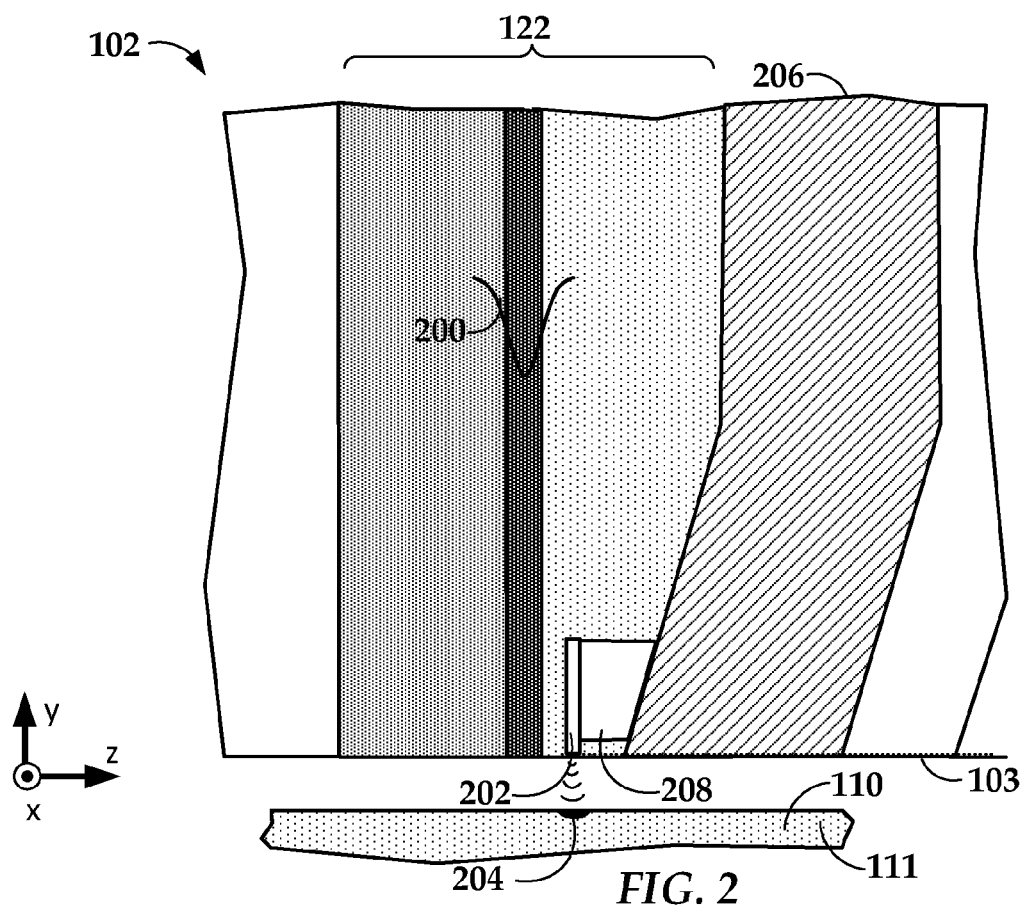
FIG. 2 is a cross-sectional view of a read/write head according to an example embodiment.

In FIG. 2, a block diagram illustrates a cross-sectional view of HAMR read/write head 102 according to an example embodiment. The details shown in FIG. 2 are also applicable to the second read/write head 132 in FIG. 1, as well as the read/write head 402 in FIG. 4. The waveguide 122 receives electromagnetic energy 200 from the energy source, and couples the energy 200 to a near-field transducer (NFT) 202. The NFT 202 is made of a metal (e.g., gold, silver, copper, etc.) that achieves surface plasmonic resonance in response to the applied energy 200. The NFT 202 shapes and transmits the energy 200 to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

Because of the intensity of the energy 200 and the small size of the NFT 202 and other optical components, the region near the NFT 202 and write pole 206 can be exposed to high temperatures during writing. These temperatures can degrade the components over time, e.g., causing components to become misshapen or material layers to diffuse into one another. To alleviate this, a heat sink 208 may be included to thermally couple the NFT 202 to the write pole 206, thereby drawing away heat from the NFT 202. Another strategy in limiting the thermal degradation of the HAMR read/write head is to reduce the time that the energy source (e.g., the laser) is continuously turned on at or near operational power, e.g., power sufficient to raise the hotspot 204 to the Curie temperature.

For purposes of this disclosure, "continuous" activation of the laser or other energy source may involve a duty cycle where the laser is intermittently deactivated or operated at reduced output power between periods of writing. These intermittent periods may include time spent traversing servo marks on the recording medium and when switching to a different track. Generally, these periods of lower power may be short enough such that components near the NFT 202 do not cool to the extent that it mitigates thermal degradation. As such, an operation such as a sequential write may be considered an operation that continuously activates the laser.

One way to limit continuous activation of the laser is to measure and limit the time during which a laser is continuously turned on. Analogous measures other than time may be used to achieve reduction in thermal degradation. For example, as it pertains to sequential writes, the system may be designed to limit an amount of sequential data that a single HAMR write transducer is called upon to record. This will have the effect of limiting the amount of time the laser continuously write, as size of a sequential write is roughly proportional to the amount of time the laser is continuously active. An example of limiting sequential write by data size is shown in the block diagram of FIG. 3.

Figure 3:
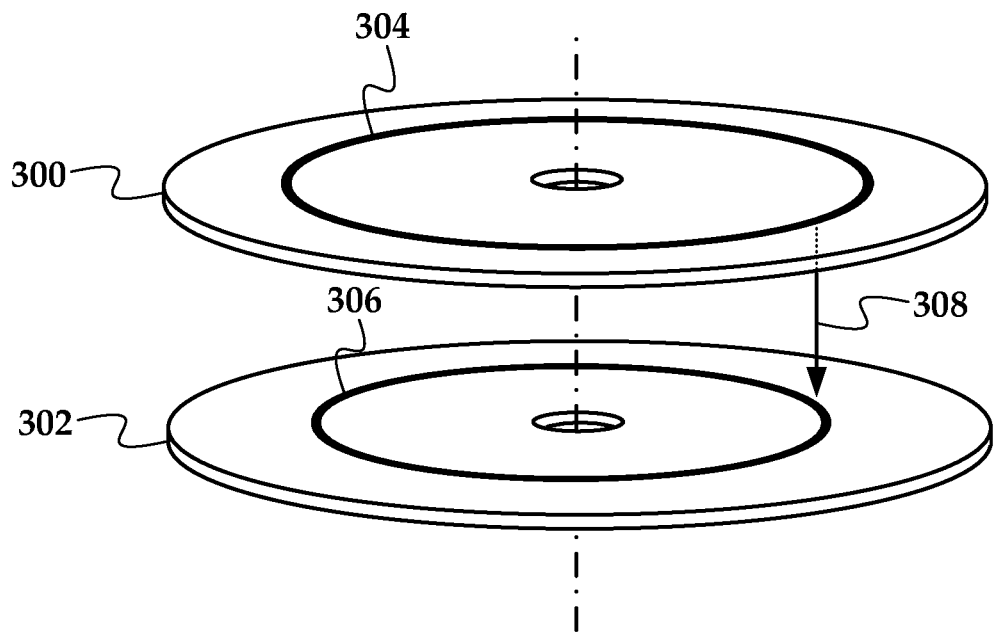
FIG. 3 is a block diagram illustrating sequential write portions being distributed across disk surfaces according to an example embodiment.

In FIG. 3, an exploded view shows two magnetic disks 300, 302 that are part of a HAMR data storage device. Each surface of the disks 300, 302 may read by separate read/write heads (not shown). For sequentially written data that reaches a certain size, the data may be split into different portions, here shown as portions 304, 306 on respective disks 300, 302. These portions 304, 306 may also be referred to as "serpents." Generally, the data may be divided into portions 304, 306 in a number of ways. For example, logical block addresses can be mapped to disk sectors such that a range of addresses is spread across portions of disk surfaces. This may facilitate mapping a range of logical block addresses to corresponding radially-defined zones on both surfaces of the disks 300, 302.

In the illustrated example the writing begins at portion 304, which may encompass a predefined number of tracks or sectors. After portion 304 is filled with the data, control switches to another head as indicated by arrow 308, which writes the remainder at portion 306. This can continue over any number of surfaces, and may repeat over the same surfaces, e.g., return to the top surface of disk 300 and write near portion 304 after all the other surfaces have been written to. While the portions 304, 306 may be the same or similar radial distances/zones, this is not required. For example, portion 306 is shown having a smaller radius than portion 304. This may or may not correspond to different radially-defined zones.

In one embodiment, the size of the portions 304, 306 is defined such the laser from a single read/write head will be energized at most for an amount of time it takes to write a single portion. This portion may be defined in terms of a maximum number of sectors. For example, the number of sectors in N outer diameter track may be defined as the longest sequential write that is allowed for a particular read/write head. Tracks at an inner diameter may have fewer sectors per track, because the length of inner tracks is less than outer tracks. As such, the maximum number of sectors may correspond to more than N tracks at an inner diameter.

In other embodiments, the time may be defined by a maximum number of tracks. For example, a write of N tracks may be defined as the maximum portion/serpent size for all radial distances. In any of these configurations, when a sequential write requires writing to more than the maximum portion/serpent size, the system will perform a head switch to another surface, allowing the previously used read/write head to cool off.

Figure 4:
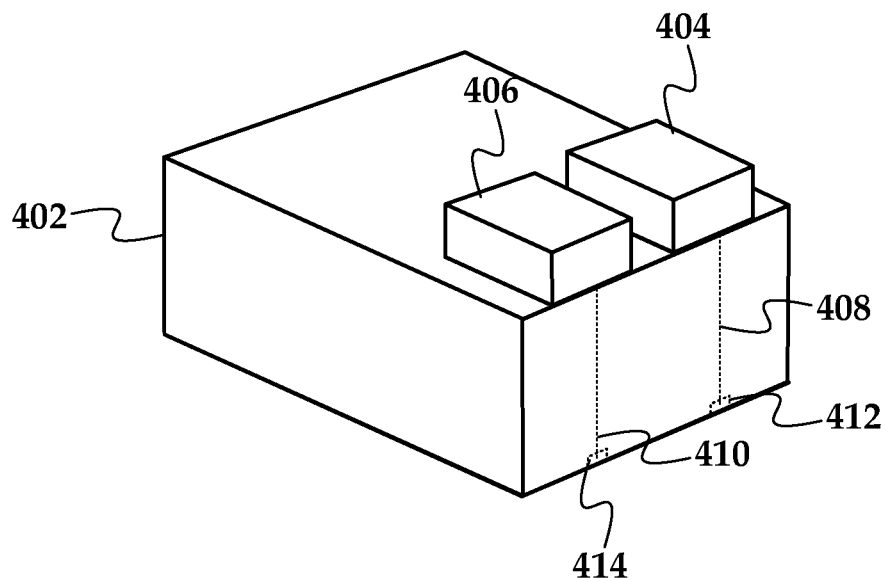
FIG. 4 is a perspective view of a read/write head with two optical paths according to an example embodiment.

In the previous example, it may be assumed that each read/write head included a single HAMR write transducer. In other embodiments, a read/write head may include more than one HAMR write transducer. An example of this is shown in FIG. 4, where a read/write head 402 includes two lasers 404, 406 and two energy delivery paths 408, 410. The energy deliver paths 408, 410 may include waveguides, NFTs, etc., as previously described, as well as separate write poles 412, 414 and associated coils (not shown). The energy delivery paths 408, 410 are offset from one another in a cross-track direction in this example, although a downtrack separation may also or instead be used.

The write poles 412, 414 and lasers 404, 406 can be activated to write independently of one another. For example, both write poles 412, 414 and lasers 404, 406 can be activated at the same time while writing the same or different data, e.g., to the same or different tracks. In another example, one of the write-pole-laser pairs 412, 404 or 414, 406 can be activated (either partially or fully) at a time, while the other is deactivated. In this latter case, thermal degradation of the energy delivery paths 408, 410 can be reduced by switching between one or the other of the write-pole-laser pairs 412, 404 or 414, 406 when a certain amount of time has elapsed. As with the previous example, other measure besides of elapsed time can be used, such as, number of tracks, sectors, bytes, etc. Unlike the previous example, there may be no need to perform a head switch at least when switching between lasers 404, 406. For example, if switching off one of the lasers 404, 406 allows the associated path to cool enough to reduce thermal degradation, then it may be possible to reduce degradation by repeatedly switching between the lasers 404, 406 without requiring a head switch.

While the above example shows two lasers 404, 406 and two energy delivery paths 408, 410, the above concepts may be similarly applied for a configuration with a single laser and two energy delivery paths. For example, an optical switching component may selectable direct laser output to two or more different optical paths. The dual-write configurations described above may also be combined with the maximum portion/serpent definition as shown in FIG. 3 in order to together reduce thermal degradation. In such a case, the maximum serpent size may be effectively doubled by switching between lasers 404, 406 on each head when writing on a surface, and then switching to another write head on a surface to write the next serpent.

As noted above, the system may be configured to reduce an amount of data recorded by any particular head during a sequential write. In conventional storage devices, a sequential write may generally involve a write operation directed to a contiguous sequence of logical block addresses that are block to a contiguous sequence of data sectors. At least part of the contiguous data sectors may be located on adjacent tracks. A conventional storage device may also deal with random writes, in which small numbers of non-contiguous sectors may be written to at a time. There may be no need to make adjustments to random write operations, where the time spent writing is much less than the time spent seeking and/or head switching. However, if there is significant buffering of random writes (e.g., via a large cache), then they may be written together similar to a sequential write, and may be subject to time or size-limited portions.

In contrast to conventional recording, a writing scheme known as shingled media recording (SMR), high track density recording (HTDR), banded recording, etc., involves writing data in contiguous groups of overlapping tracks. An example of SMR recording is shown in the block diagram of FIG. 5. Tracks 500-502 are written in order by write pole 504, with the later-written tracks overlapping part of the previously written tracks. The different shading within the tracks 500-502 indicates different magnetic orientations used to represent different bit values.

Figure 5:
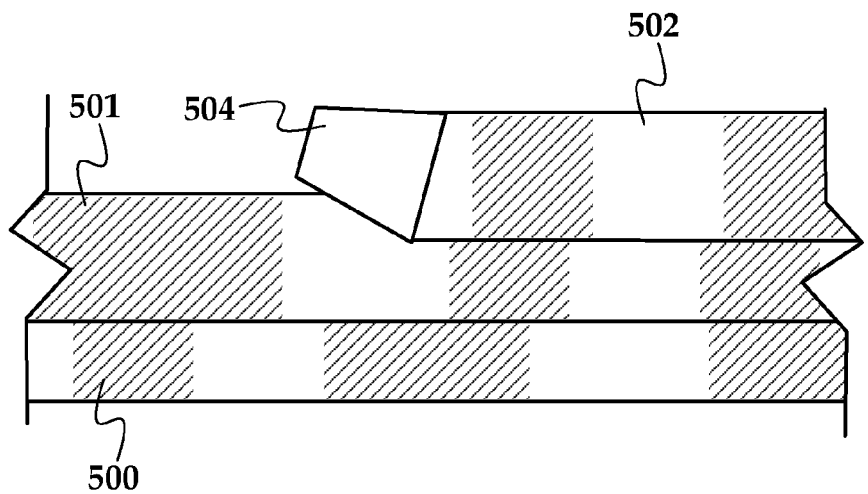
FIG. 5 is a diagram of shingled writing tracks according to an example embodiment.

As seen in FIG. 5, overlapping of adjacent tracks can result in narrower tracks, thereby increasing areal density. However, because of the way adjacent tracks overlap, earlier-written tracks may not be randomly re-written without disturbing later-written, neighboring tracks. Such an SMR device therefore may write a relatively large group of tracks together as a block, and may provide features (e.g., non-volatile cache, separation of random and sequential data streams) for dealing with small, random updates so that overall performance is not significantly impacted. In some configurations, an SMR storage device may include different zones for conventional tracks and shingled tracks, or may include use shingled tracks. In either event, the above-noted limitation on maximum sequential writes may also be enforced when writing shingled track portions.

While an SMR storage device may not allow random updates to overlapping groups of tracks, the track groups need not be written in a single operation. For example, track 500 may be written during a long sequential write. After track is written, a head switch may occur after which other heads are used to continue the sequential write on another surface. Thereafter, as part of the same sequential write operation or a different write operation, writing may commence on track 501, which overlaps track 500. As such, a HAMR SMR device may define maximum portion/serpent sizes for writing without affecting shingling of the tracks.

Figure 6:
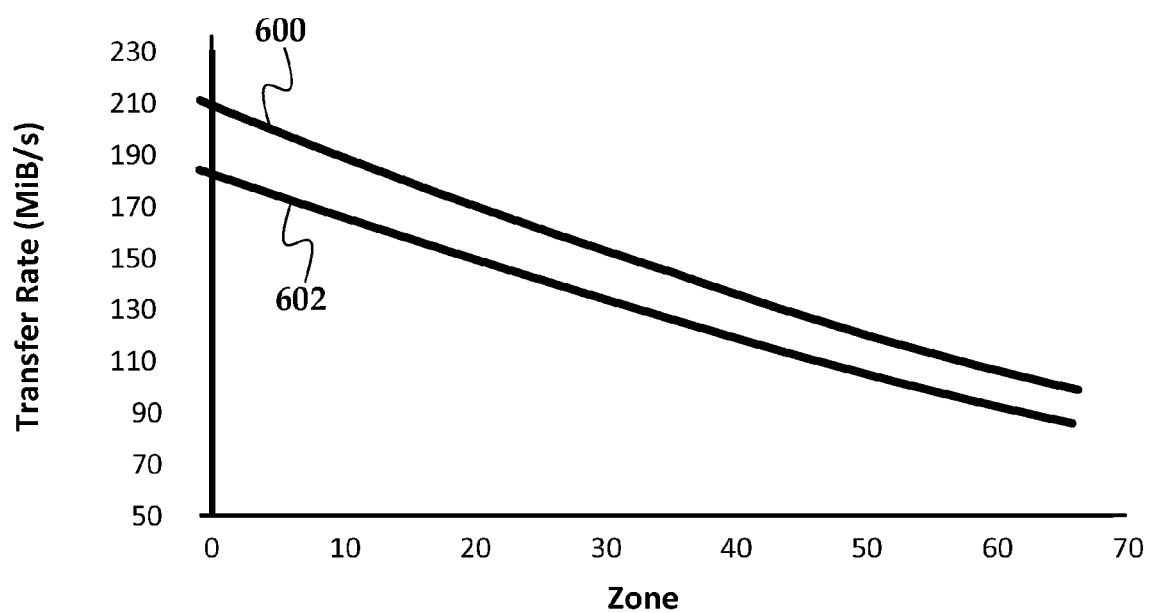
FIG. 6 is a graph illustrating effects of different maximum sequential write portion sizes on data transfer rate according to an example embodiment.

In embodiments where a maximum portion size is defined, sequential writes may involve more head switches than where a larger limit or no limit is imposed. In FIG. 6, a graph illustrates how this can impact data transfer rates of a sequential write according to an example embodiment. The graph in FIG. 6 shows a simulation results of data transfer rates of a large sequential write using a 200 track maximum serpent size (curve 600) and a one track maximum serpent size (curve 602). In this example the use of a single track serpent size loses about 12% of performance compared using a serpent size of 200 tracks. In some cases, this may be an acceptable trade-off between speed and reliability. In some existing drives, the number of tracks per serpent is less than 50, and therefore the real world impact of reducing serpent sizes may experience less than shown here. In some embodiments, a HAMR device may include additional features that mitigate reduction in throughput due to the use of smaller serpent sizes for sequential writes.

Figure 7:
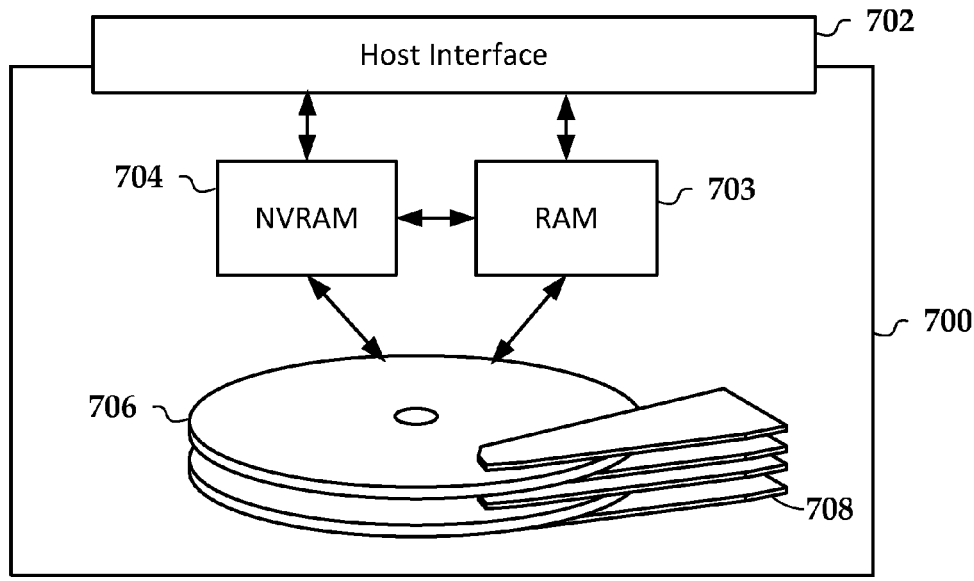
FIG. 7 is a block diagram of a storage device with a memory buffer according to an example embodiment.

In FIG. 7, a block diagram illustrates features to improve throughput for an apparatus 700 according to an example embodiment. Generally, data is sent and received via a host interface 702. The host interface 702 may include an input-output standard used for block communications such as SATA, PCI-E, SCSI, etc. The apparatus includes one or both of volatile random access memory (RAM) 703 and non-volatile RAM (NVRAM) 704. The volatile RAM 703 may include dynamic RAM (DRAM), static RAM (SRAM), etc., and the NVRAM 704 may include flash memory, resistive memory, etc. The apparatus also includes one or more hard disks 706 that are read from and written to by read/write heads mounted to an arm assembly 708.

Generally, one or both of the RAM 703 and NVRAM 704 can be arranged to buffer data that is ultimately written to the hard disks 706. For example the RAM 703 and NVRAM 704 can be arranged as a hierarchical cache in which all read and/or write operations are first directed to a faster layer of cache (e.g., RAM 703) and then progressively moved to the slower layers of storage, e.g., NVRAM 704 and disks 706 respectively. In such a case, the criteria for moving cache from the NVRAM 704 to the disks 706 may be that either the write will involve less than the maximum sequential write size, or that larger writes will not impact apparent performance at the host interface. For example, a sequential write could be directed to the NVRAM 704 (either through the RAM 703 or bypassing the RAM 703) to minimize time it takes to receive and store all the data from the host, and at the same time the same data is more slowly written from the NVRAM 704 to the disks 706, using a maximum portion size as described above. The latter operation will likely take longer, but this won't be apparent to the host. Once the full amount of data of the sequential write is stored on the disks 706, it can be removed from the NVRAM 704.

In another example, the RAM 703 or NVRAM 704 may be used somewhat differently than a cache. Generally, a cache uses an algorithm related to data access pattern (e.g., least recently used) to move data between layers of the cache. In this case, an intermediate layer such as the NVRAM 704 may be used a write buffer which stores data destined for the disks 706 but does not retain data based on an expectancy of it being read back again by the host. The RAM 703 may be used for that role, such that some duplicate data exists in both RAM 703 and NVRAM 704. In such a case, the same data in the RAM 703 and NVRAM 704 may be moved to the disks 706 using different criteria, and some coherency mechanism may be used to make sure the copies stay synchronized.

Figure 8:
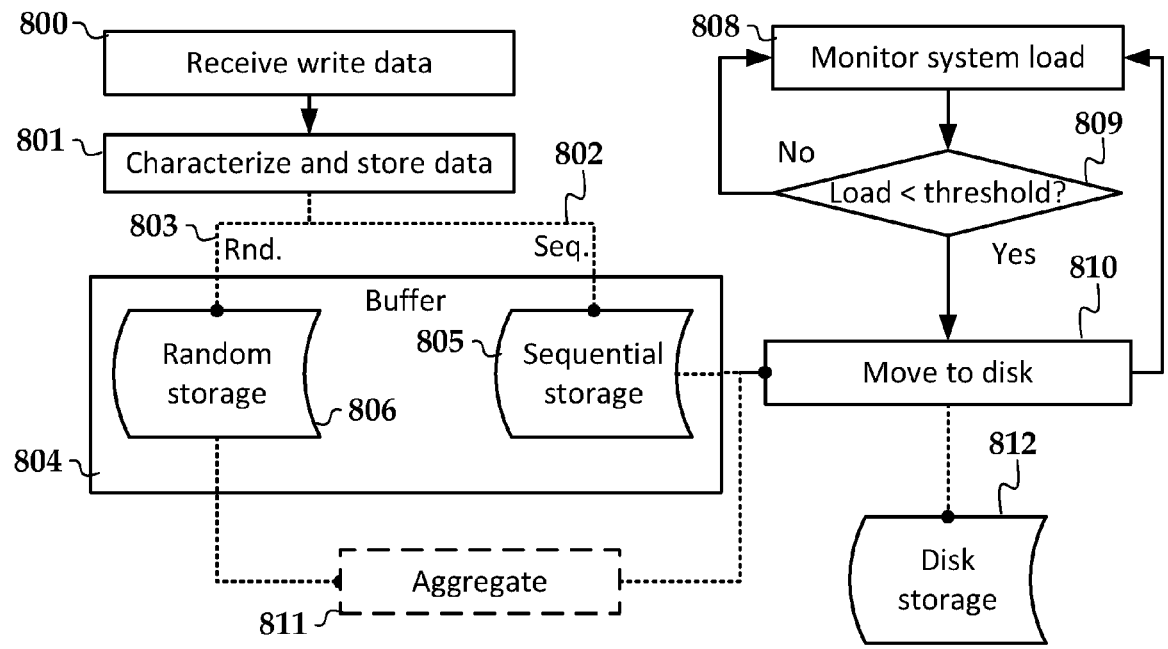
FIG. 8 is a flowchart of a procedure according to an example embodiment.

In FIG. 8, a flowchart illustrates how a buffer 804 may be implemented according to an example embodiment. It will be understood that the buffer 804 may include any combination of volatile RAM or NVRAM. Generally, a processor receives 800 write requests, which may be from the host and/or from another, internal process (e.g., configuration, metadata storage). The write is characterized 801 as at least sequential or random, as indicated by storage paths 802, 803. The data is stored in respective sequential storage parts 805 and random storage parts 806 of the buffer 804. The different storage parts 805, 806 may use the same or different memory types.

A parallel process involves monitoring 808 system load. System load may include any combination of internal processor usage, data throughput via host or media interfaces, available buffer capacity, etc. If it is determined 809 that the load is below a threshold, data stored in one or both parts 805, 806 of the buffer 804 moved 810 from the buffer 804 to disk storage 812. By performing the movement 810 of data when load is low, the activity will have less impact on host operations. In some cases, e.g., where the disk storage 812 uses SMR, the random data may be aggregated 811. This may involve collecting small write requests and writing them together similar to a sequential write. Generally, the move operation 810 may involve defining a maximum sequential write portion, and dividing the write so that it is distributed among different write transducers of disk storage 812. This may include different write transducers on a common head and/or different write transducers on different heads.

It will be understood that the diagram in FIG. 8 is only one example of how an intermediate layer of memory can be used to compensate for additional head switches (or other operations) which may be a side effect of defining a maximum write portion/serpent size. As noted above, cache criteria may be used to move data from the buffer 804 to the disk storage 812, and classification of data as random and sequential may be optional.

Figure 9:
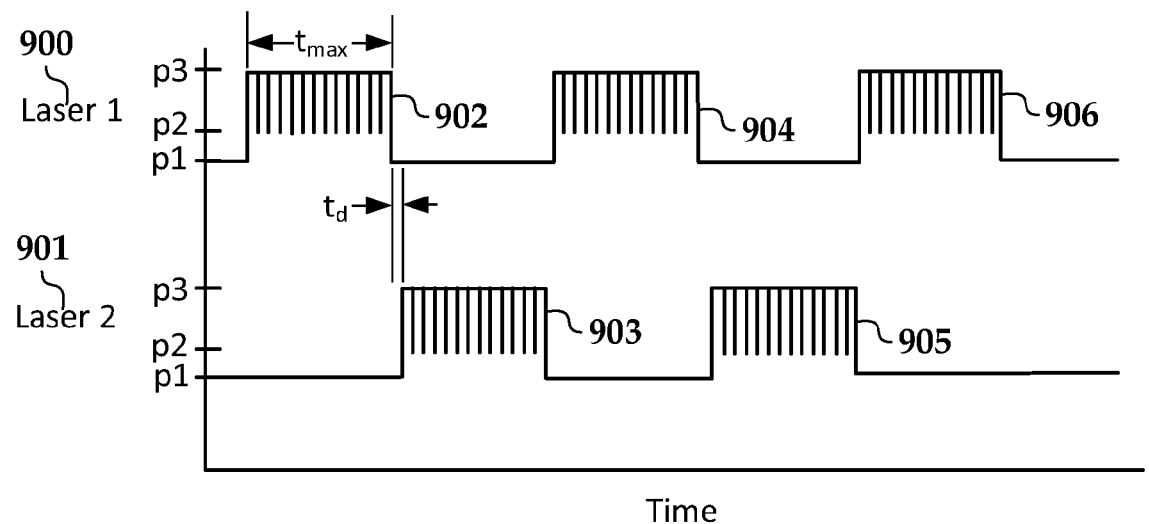
FIG. 9 is a signal diagram illustrating switching between different lasers in an apparatus according to an example embodiment.

In FIG. 9, a signal diagram illustrates how a sequential write may be divided between two optical paths according to an example embodiment. In this example, signal diagram shows power level (which may be defined by applied current and/or voltage) applied to two separate lasers 900, 901. The lasers 900, 901 may be mounted on different read/write heads and write to different surfaces of a recording medium. In other embodiments, the lasers 900, 901 may be mounted on the same read/write head and write to the same surface of a recording medium. In this example a maximum sequential write portion is defined as time $t_{max}$ and may be implemented as a time out (e.g., measured using system clock) or as a maximum data size (e.g., number of tracks, sectors, etc.) that roughly corresponds to $t_{max}$.

The sequential write begins by writing via the optical path associated with the first laser 900, as indicated by sequential write portion 902. Generally, the lasers are at power level p1 when not performing a sequential write, and p1 may be at or near zero power. When writing to data sectors, the laser are at fully energized power p3. When performing activities within the sequential write that do not involve heating the recording medium (e.g., track switch/seek, traversing servo sectors), an intermediate power level p2 may be used. Power level p2 may cause the laser to emit some amount of light, but without enough intensity to heat the recording medium to the Curie temperature. As seen in sequential write portion 902, the sequential write may involve numerous transitions between power levels p2 and p3.

At the end of sequential write portion 902, $t_{max}$ has elapsed, and so the sequential write is shifted to the optical path associated with laser 2, as indicated by sequential write portion 903. There may be a delay when switching between lasers (e.g., a head switch or realignment of the same read write head to use a second transducer) as indicated by time $t_d$ between sequential write portions 902 and 903. The alternating between lasers continues for subsequent write portions 904-906. In this case, the full sequential write requires $5*t_{max}$ time units to complete. Or where data units are used to define the maximum sequential write portions, each portion 902-906 may involve writing N data units, and the full sequential write is for 5*N data units. It will be understood that this example can be extended to more than two lasers, and some write portions (e.g., the last written portion) may be less than N units of data or less than $t_{max}$ units of time.

Figure 10:
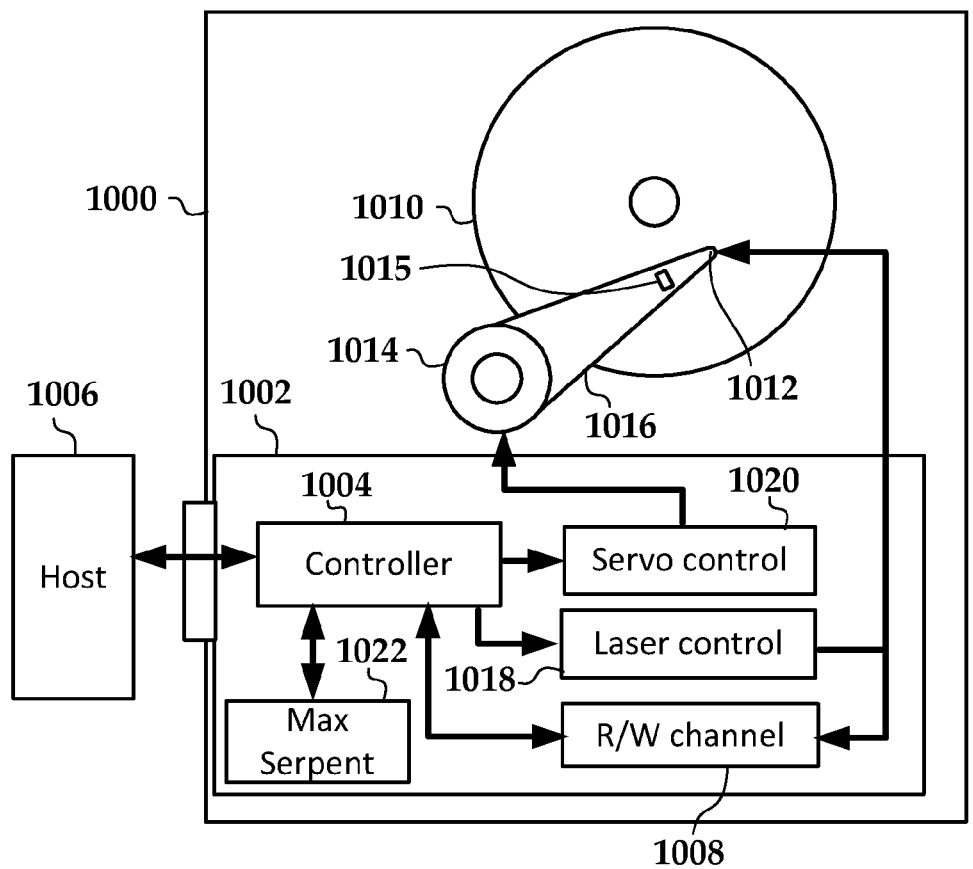
FIG. 10 is a block diagram of an apparatus according to an example embodiment.

In FIG. 10, a block diagram illustrates a data storage system according to an example embodiment. A data storage apparatus 1000 includes logic circuitry 1002 used to read data from and write data to one or more magnetic disks 1010. The magnetic disks 1010 are configured as a heat-assisted magnetic recording medium. The logic circuitry 1002 includes one or more controllers 1004 that perform operations associated with storing and retrieving data from the disks 1010. The operations include processing read and write commands that originate from a host device 1006. The host device 1006 may include any electronic device that can be communicatively coupled to store and retrieve data from a data storage device, e.g., a computer, peripheral bus card, factory testing apparatus, etc.

The controller 1004 is coupled to a read/write channel 1008 that processes data read from and written to the magnetic disks 1010. The read/write channel 1008 generally converts data between the digital signals processed by the controller 1004 and the analog signals conducted through one or more read/write heads 1012 (also referred to as a recording head). The read/write heads 1012 are positioned over the magnetic disks 1010 via a servo motor 1014 (e.g., voice coil motor) that moves one or more arms 1016 to which the read/write heads 1012 are mounted. One or more microactuators 1015 may also be included that move the read/write heads 1012.

During write operations, a laser control circuit 1018 sends power to one or more lasers (or similar thermal energy producing devices) of the read/write head 1012. The laser control circuit 1018 may include a DAC, preamplifier, filters, etc., that control and condition signals send to the lasers, which are used energize a near-field transducer that creates a hotspot on the disk 1010 during recording. The controller 1004 may receive feedback signals (not shown) that assist in controlling the laser, such as intensity readings from a head-mounted photodiode, etc.

A servo controller 1020 is part of a control system that positions the read/write head 1012 over the disk. 1010. The read/write head 1012 reads servo marks on the disk 1010, which are converted to servo data (e.g., track information, position error) via the read/write channel 1008. The servo controller 1020 uses the servo data to drive the servo motor 1014 and microactuators 1015 to a desired location.

As indicated by block 1022, a serpent definition may be used by the servo controller 1020 and laser controller 1018 to define a maximum write duration for the read/write heads 1012 before thermal degradation of transducers of the read/write heads 1012 occurs. This may involve mapping of logical block addresses to physical tracks and sectors of the magnetic disks 1010 such that a write to a contiguous block of logical block addresses results in switching between write transducers before the maximum write duration occurs.

Figure 11:
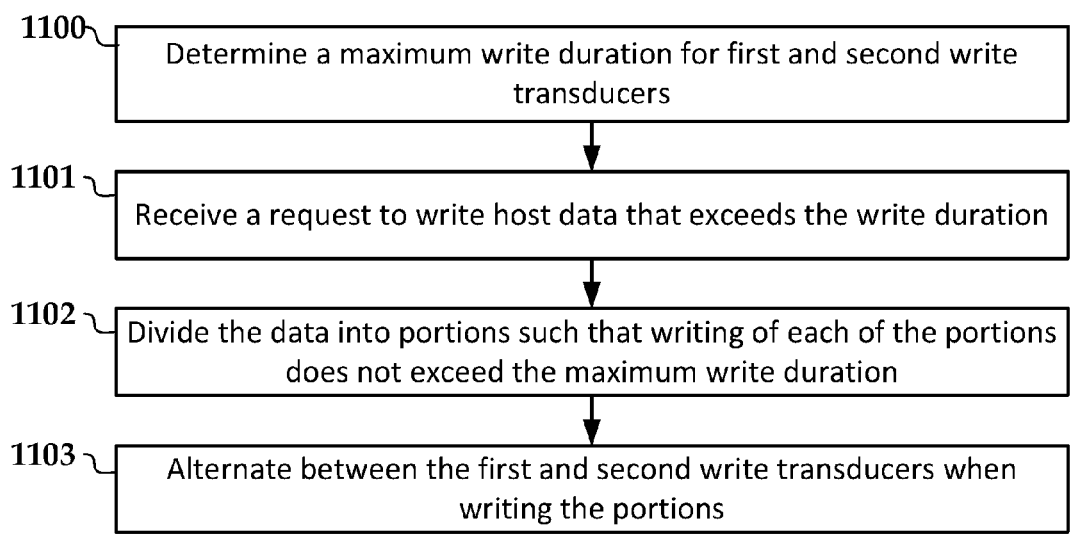
FIG. 11 is a flowchart of a method according to an example embodiment.

In reference now to FIG. 11, a flowchart illustrates a method according to an example embodiment. The method involves determining 1100 a maximum write duration for first and second heat-assisted write transducers of a data storage device before thermal degradation of the first and second write transducers occur. A request is received 1101 to write host data to a heat-assisted recoding medium. A time to fulfill the request exceeds the write duration. The data is divided 1102 into portions such that a respective writing of each of the portions does not exceed the maximum write duration. Writing successive ones of the portions to the heat-assisted recording medium involves alternating 1103 between the first and second write transducers.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   determining a maximum write duration for first and second heat-assisted write transducers of a data storage device before thermal degradation of the first and second write transducers occur;
   receiving a request to write data to a heat-assisted recording medium;
   in response to a time to fulfill the request exceeding the maximum write duration, dividing the data into portions such that a respective writing of each of the portions does not exceed the maximum write duration;
   alternating between the first and second write transducers when writing successive ones of the portions to the heat-assisted recording medium.

2. The method of claim 1, wherein the first and second write transducers write to different surfaces of the heat-assisted recording medium.

3. The method of claim 1, wherein the first and second write transducers write to a same surface of the heat-assisted recording medium.

4. The method of claim 1, wherein the maximum write duration corresponds to a time needed to write a selected number of tracks of the heat-assisted recording medium.

5. The method of claim 4, further comprising determining that the time to fulfill the request exceeds the write duration based on a size of the request exceeding the selected number of tracks.

6. The method of claim 1, further comprising writing the data to a buffer in response to the request, wherein the writing of the successive ones of the portions to the heat-assisted recording medium comprises moving the data from the buffer to the heat-assisted recording medium.

7. The method of claim 6, wherein the buffer comprises a non-volatile memory.

8. The method of claim 6, wherein the buffer comprises a volatile memory.

9. The method of claim 1, wherein writing the successive ones of the portions to the heat-assisted recording medium comprises alternating between a fully active laser power when writing the data and a partially active laser power when performing one of a seek and traversal of a servo mark.

10. The method of claim 1, wherein the writing the portions to the heat-assisted recording medium comprises shingled writing of the portions.

11. An apparatus, comprising:
    a controller configured to write to a heat-assisted recording medium via first and second heat-assisted write transducers, the controller configured to:
       determine a maximum write duration before thermal degradation of the first and second write transducers occur;
       receive a request to write data to the heat-assisted recording medium;
       in response to a time to fulfill the request exceeding the maximum write duration, divide the data into portions such that a respective writing of each of the portions does not exceed the maximum write duration;
       alternate between the first and second write transducers when writing successive ones of the portions to the heat-assisted recording medium.

12. The apparatus of claim 11, wherein the first and second write transducers write to different surfaces of the heat-assisted recording medium.

13. The apparatus of claim 11, wherein the first and second write transducers write to a same surface of the heat-assisted recording medium.

14. The apparatus of claim 11, wherein the write duration corresponds to a time needed to write a selected number of tracks of the heat-assisted recording medium, and wherein the controller is further configured to determine that the time to fulfill the request exceeds the write duration based on a size of the request exceeding the selected number of tracks.

15. The apparatus of claim 11, wherein the controller is further configured to write the data to a buffer in response to the request, wherein the writing of the successive ones of the portions to the heat-assisted recording medium comprises moving the data from the buffer to the heat-assisted recording medium.

16. The apparatus of claim 11, wherein writing the successive ones of the portions to the heat-assisted recording medium comprises alternating between a fully active laser power when writing the data and a partially active laser power when performing one of a seek and traversal of a servo mark.

17. A method comprising:
    mapping logical block addresses of a data storage device to sectors of a heat-assisted recording medium such that writing to a contiguous range of the logical block addresses results in a laser of a heat-assisted recording write transducer being energized for no more than a maximum write duration to reduce thermal degradation of the write transducer; and using the mapping when writing sequential data to the heat-assisted recording medium via the write transducer.

18. The method of claim 17, wherein using the mapping comprises switching from the write transducer to a second write transducer when writing the sequential data when the laser of the write transducer is energized for the maximum write duration.

19. The method of claim 17, wherein writing the sequential data to the heat-assisted recording medium via the write transducer comprises shingled writing.

20. The method of claim 1, wherein determining the maximum write duration for the first and second heat-assisted write transducers before thermal degradation occurs comprises mapping logical block addresses to sectors of the heat-assisted recording medium such that writing to a contiguous range of the logical block addresses results in lasers of the first and second write transducers being energized for no more than maximum write duration.

* * * * *